June 12, 1951     W. H. TROEDSON     2,556,564
GAUGE FOR MEASURING THREAD TRUNCATION
Filed June 28, 1946
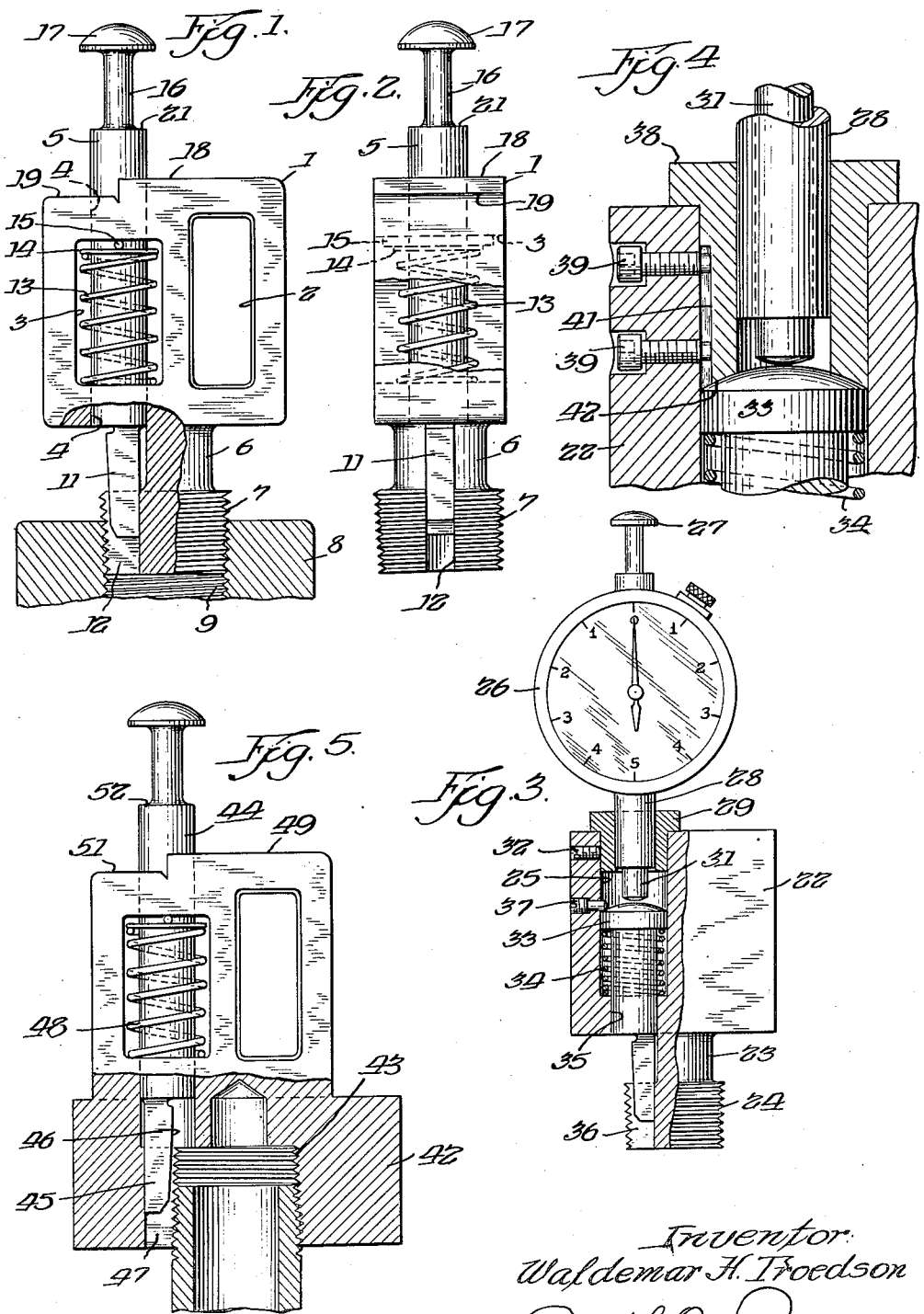
Inventor
Waldemar H. Troedson Patented June 12, 1951

2,556,564

UNITED STATES PATENT OFFICE 2,556,564

GAUGE FOR MEASURING THREAD TRUNCATIONS

Waldemar H. Troedson, Chicago, Ill., assignor to Crane Co., Chicago, Ill., a corporation of Illinois Application June 28, 1946, Serial No. 680,211

1 Claim. (Cl. 33—199)

This invention relates to a measurement gauge. More particularly it relates to a gauge for checking the truncation at the crests of tapered pipe threads or other tapered surfaces, either annular or in a single plane.

At the outset, in order to obtain a true appreciation of the value of this inventive contribution, it should be understood that it has long been a problem in measuring one of the more important elements of male or female threads pertaining to truncation or taper of the thread. The latter element is of course very important because it figures so significantly in what is termed by the trade, the proper amount of make-up necessary in effecting a suitable pipe joint, say between a pipe fitting and a piece of threaded pipe, threaded for example in accordance with the American standard for tapered pipe threads, and which ditmensional standard is illustrated in more detail on page 590 of Crane Co.'s No. 41 catalog. As indicated therein, ring gauges as they are termed, have been used previously in order to check the taper or truncation of the thread. But in most instances this procedure has been quite expensive due to the fact that it requires a considerable amount of time and in many cases because of deposits of foreign matter or slight surface imperfections on the threads, it has been difficult to apply the gauge accurately to render a true record of the actual truncation of the part being measured. It should of course be understood that in many cases it has been necessary to measure or gauge the product as it is being processed on a production line, the material necessarily being inspected at times when the production is relatively high because of the extraordinary wear on tools frequently occurring on such occasions.

Thus it is one of the more important objects of this invention to provide a type of gauge for checking truncation which is easily portable and which also can be applied without difficulty. It may also be quickly removed when gauging of the product has been completed and is durable in withstanding rough handling. It can also be easily used by those persons of ordinary skill in the shop.

Another object is to provide a measuring device of the character hereinafter described in which the amount of truncation can be accurately checked irrespective of thread diameter variations and without requiring the use of say the band of the fitting. At the same time it eliminates the need of adjusting the plunger for each fitting size, thereby reducing the normal gauging time required very substantially from that heretofore required.

Other important objects and advantages of this invention will become more readily apparent when the specification is read in light of the accompanying drawings, in which:

Fig. 1 is a front view of a preferred form of the novel gauge applied to product.

Fig. 2 is a side view of same.

Fig. 3 is a modified form of the invention employing a dial gauge for visual measurement.

Fig. 4 is a modified form of bushing employed.

Fig. 5 is a modified form of the invention employed for gauging male threads.

Similar reference characters apply to like parts throughout the several views.

Referring to Fig. 1, the housing or shell (sometimes termed a base) generally designated 1 which is of block shape is provided preferably with two transversely extending apertured portions 2 and 3 respectively, the aperture 2 being merely for the purpose of providing a convenient method of handling the gauge as well as to reduce its weight and to provide a more uniform cross-section of metal for heat treatment purposes. The aperture 3 in cooperation with the oppositely extending bored portion 4 provides for the reception of the cylindrical plunger or rod 5 which is snugly fitted so as to provide preferably for a sliding fit with the housing 1. At the lower end of the shell 1, a depending shank portion 6 is provided which is preferably integral therewith. The lower end of the shank portion 6 is carefully machined with a gauging end, the details of which depend upon the nature of the truncated product to be gauged. In the instant case, as indicated at 7, the threaded portion may be provided for gauging the truncation of tapered threads of the type hereinabove referred to. This particular form however is not absolutely essential to the application of this invention and it may therefore be dispensed with. The threaded product 8, as for example a fitting, a tank or a cylinder receives the head 7 and is threaded at 9 as shown. The head 7 is screwed in, hand tight.

At the lower portion of the plunger 5 a preferably integral extension 11 is provided which is receivable in a close sliding fit in the machined groove 12. Because of the use of the coiled spring 13 together with the washer 14 and the pin 15 the plunger is maintained in a retracted position until its use is actually required. Preferably, although not necessarily, the plunger 5 at its upper end is provided with a neck or shank 16 and a button head 17 for depressing the plunger as desired in the normal course of the truncation gauging operation. The upper portion of the shell 1 is preferably provided with shouldered portions in different planes, namely 18 and 19 respectively, which to those skilled in the art are identifiable respectively as the minimum notch and the maximum notch and represent a tolerance between which the dimension of acceptable truncation must fall. Similarly the plunger 5 is provided with a gauging surface 21 at the lower limits of the shank portion 16. Accordingly each of these surfaces namely, 18, 19, and 21 are accurately and carefully machined for reasons hereinafter further made clear.

In considering the method of operation it should be understood that the threaded shank portion 7 is preferably screwed into the product 8, hand tight as it is termed, that is without use of any machine to accomplish the latter assembly.

With a reasonably light pressure, the buttonhead 17 is depressed so as to thereby move the snug-fitting plunger 5 downward within the shell until the tapered surface portion 11 of the plunger extension contacts the crests of the threads and retains that position. At this stage of the gauging operation the position of the gauging face 21 on the plunger should be noted with relation to the maximum and minimum notch surfaces 19 and 18 respectively at the top portion of the shell 1. If the product being checked comes within proper measurements, it has been found that the gauging face 21 should be between surface 18 and surface 19, or alined flush with one or the other. This positioning of the plunger thus determines acceptability of tapped product insofar as the truncation of the crests of the threads is concerned. With this determination completed the plunger button 17 is then released which permits the plunger to move immediately to its original position under the influence of the compressed spring 13. If the plunger 5 at its extension surface 11 should stick slightly, the button head may be pulled upwardly, thus disengaging it from the threads 9 of the product.

After the plunger has been so released, the gauge may then be unscrewed and disassembled in the usual manner without injury.

As previously stated and as shown in Fig. 3, instead of using the respective gauging surfaces 18, 19 and 21 in connection with the plunger 5 and the shell 1, it may be desirable for improved visual results to employ an indicator gauge in which the shell 22 is provided with the depending shank extension 23 having the threaded end portion 24 for gauging purposes as described in connection with Figs. 1 and 2. However, instead of having the projecting button as shown in the latter mentioned figures the body or shell 22 is bored as at 25 to receive a dial gauge generally designated 26 having the button-head 27 and a lower sleeve portion 28 receivable within the split bushing 29, the latter member snugly gripping the sleeve 28 to hold the dial gauge 26 firmly in position within the body 22. The button-head 27 has an end portion generally extending clear through the sleeve 28 as indicated at 31. The split bushing 29 is held in gripping position preferably by means of a headless set screw 32. Receivable within the bored chamber 25 is the enlarged head portion of the separate auxiliary plunger member 33, the latter member being spring loaded by means of the spring 34 and which is retained and held against lateral movement within the opening 35 and also similarly supported within the slot 36 of the threaded end 24. The plunger member 33 operates in the same manner insofar as determining truncation of the thread is concerned as described in connection with Figs. 1 and 2, except that in this modified form instead of observing the movement of the plunger surface 21 relative to the shell gauging surfaces 18 and 19, the movement of the plunger member 31 when the button 27 of the dial gauge is depressed against the auxiliary plunger 33 is measured more clearly by noting the movement of the hands of the dial gauge 26. In the same manner as described in connection with Fig. 1 when the button 27 of the dial gauge is released the auxiliary plunger 33 is permitted to return to its original position.

It is preferable to stop the plunger 33 from striking the end of the shaft 31 in order to prevent damage to the dial gauge mechanism. This is accomplished by placing transversely in the bored chamber 25 a projecting screw 37 as shown. In other respects the operation of the plunger in this modified form is similar to that described in connection with Fig. 1. The type of indicator for the dial gauge will necessarily vary depending upon the conditions of gauging required for the inspection and the same applies whether or not the indicator of the gauge is placed in a vertical position or whether it is placed sideways for example, and records the movement of the plunger based upon direct contact against the tapered surface.

A modified form of split bushing may be used as an adjustable stop for the plunger head 33 as shown in the enlarged view of Fig. 4; thus the elongated split bushing 38 may be used with the set screws 39 contacting a groove 41 in the bushing, the mandrel head normally contacting the annular lower shoulder 42. The screws 39 hold the bushing accurately against longitudinal movement, and permit easy adjustment. Thus damage to the dial indicator plunger shaft 31 is prevented since the head 33 will stop at or shoulder against the surface 42 before it can strike the member 31.

As shown in Fig. 5, this invention is not limited only to gauging female threads, but may also be used to measure truncation on male threads in which the ring housing designated 42 and which is the equivalent of the shell 1 previously described to be applied to male threads, is provided with the threads 43, the plunger 44 and the extension 45 with the tapered surface 46 and fitted snugly within the receiving slot 47. The usual spring 48 and the gauging surfaces 49 and 51 are provided. In conjunction therewith, the surface 52 of the shoulder of the plunger is used as described in connection with Figs. 1 and 2. Thus it will be apparent that the tapered surface 46 of the extension 45 bears against the external crest of the threads of the pipe as the plunger 44 is moved inwardly thereby to indicate in a similar manner the truncation as described in connection with Figs. 1, 2 and 3.

While the instant invention has been shown in but three forms or modifications, it is obvious to those skilled in the art that it is not so limited but is susceptible of numerous changes and modifications without departing from the spirit thereof or the scope of the appended claim.

I claim:

A gauge for measuring the crest truncation of tapered pipe threads, the combination including a housing, a divided plunger snugly guided and reciprocably movable within the said housing, means on the said plunger for actuating the said plunger, the said housing having an extension for threaded engagement with a tapered portion whose truncation is to be measured, a lower portion of the said plunger having an extension with a tapered surface corresponding to the tapered portion to be measured, means on the housing for closely guiding the plunger extension against transverse movement, dial indicating means cooperating with the said divided plunger to indicate the relative position of the plunger when truncated crests of the threads are contacted by the extension of said plunger.

WALDEMAR H. TROEDSON.

REFERENCES CITED

The following references are of record in the file of this patent:

UNITED STATES PATENTS

| Number | Name | Date |
| --- | --- | --- |
| 2,233,626 | McClure | Mar. 4, 1941 |
| 2,339,699 | Husband | Jan. 18, 1944 |
| 2,387,814 | Straw | Oct. 30, 1945 |